United States Patent [19]
Kreithen et al.

[11] 3,932,796
[45] Jan. 13, 1976

[54] CONTROL SYSTEM FOR PRODUCING MULTI-AXIS CONTOUR MOVEMENT FOR A STEPPING MOTOR DRIVE

[75] Inventors: Marvin L. Kreithen, Huntingdon Valley; John J. Lawler, Jr., Newportville, both of Pa.

[73] Assignee: Textron, Inc., Providence, R.I.

[22] Filed: Jan. 31, 1973

[21] Appl. No.: 328,285

Related U.S. Application Data

[62] Division of Ser. No. 224,752, Feb. 9, 1972, Pat. No. 3,767,990.

[52] U.S. Cl. .............. 318/685; 318/603; 318/604; 318/696
[51] Int. Cl.² ........................................ G05B 19/40
[58] Field of Search .......... 318/600, 685, 696, 603, 318/604, 597

[56] References Cited
UNITED STATES PATENTS

| | | | |
|---|---|---|---|
| 3,411,058 | 11/1968 | Madsen et al. | 318/696 |
| 3,414,785 | 12/1968 | Orahood | 318/685 |
| 3,435,314 | 3/1969 | Bradley et al. | 318/685 |
| 3,523,230 | 8/1970 | York | 318/685 |
| 3,553,549 | 1/1971 | Leenhouts | 318/696 |
| 3,579,279 | 5/1971 | Inaba | 318/696 |
| 3,582,751 | 6/1971 | Rosshirt et al. | 318/696 |
| 3,617,715 | 11/1971 | Dummermuth | 318/696 |
| 3,648,144 | 3/1972 | Rosen | 318/696 |
| 3,789,971 | 2/1974 | Deyesso et al. | 318/685 |

*Primary Examiner*—Robert K. Schaefer
*Assistant Examiner*—John J. Feldhaus
*Attorney, Agent, or Firm*—Dorfman, Herrell and Skillman

[57] ABSTRACT

A multi-axis machine tool or the like employing controls for an open loop stepping motor system of two or more axes in which variable frequency feedrate clock pulses are generated to ultimately control the speed of the various stepping motors. The frequency of the feedrate clock pulses is modified in accordance with programmed information; additional information defines the tool path which can either be straight line or circular arc segments and characteristically the feedrate clock pulse generation means increases pulse frequency at the beginning of a segment in such manner as to increase motor speed in accordance with system inertial limitations from a speed below to a speed above the slewing rate of the stepping motors. Thereafter upon sensing a predetermined distance from the end of the segment, pulse frequency is reduced to reduce the stepping motor speed below the slewing rate. Override means is provided to permit an operator to selectively increase or decrease pre-programmed rate to compensate for variable machining factors such as differences in materials, and dullness of tool.

14 Claims, 4 Drawing Figures

CONTROL SYSTEM FOR PRODUCING MULTI-AXIS CONTOUR MOVEMENT FOR A STEPPING MOTOR DRIVE

This application is a divisional application of our U.S. application, Ser. No. 224,752, filed Feb. 9, 1972 now U.S. Pat. 3,767,990 and entitled Control System for Producing Multi-Axis Contour Movement for a Stepping Motor Drive.

This invention relates to automatically controlling the motion of machine tool slides and other multi-axis mechanisms by using step motors. Considering the machine tool application as typical, a control system is provided for causing tool movement relative to a work piece to achieve two or three dimensional contouring of the work piece to a predetermined shape in accordance with a predetermined program.

A stepping motor effectively consists of a rotor magnetically detented at fixed positions of a stator. In carrying out the present invention, particular consideration has to be given to the characteristics of commercially available stepping motors. In particular a change in energization of the windings of a stepping motor in a proper sequence effects an incremental rotative movement or step; moreover, the sequence of the change of energization will determine whether the motor will rotate in one direction or the other. At low-step rates, the rotor will move in increments from one fixed position to the next and be held by the magnetic detent. However, at higher step rates, the inertia of the rotor and its coupled load are such that if the step commands are instantaneously removed, the rotor will overdrive the magnetic detent of the next position and thus mis-step. In an open loop system, a mis-step cannot be corrected and thus the system will permanently lose position and be inaccurate. At this high step rate, the step motor is said to be "slewing", i.e., the magnetic force of the stator is sufficient to drive the rotor from position to position, but not sufficient to overcome the inertia of the rotor and its load.

In accordance with the present invention in order to achieve high speed stepping rates, means is provided to cause the step motor to be gradually accelerated to, and decelerated from, the slew rate; moreover, step commands, once slewing is achieved, must be evenly spaced in time.

More specifically, the present invention provides pulse generator means for generating a train of pulses of variable frequency including means for varying the frequency of pulses generated by said pulse generator means both above and below the slewing range of said step motor. Acceleration means causes the pulse generator means to modify pulse frequency upon demand. Particularly at the beginning of each of the successive segments which together approximate the predetermined rate accommodating the inertial load on the step below slewing range into slewing range at a predetermined rate accomodating the inertial load on the step motor. Also toward the end of such segments ordinarily means is provided for sensing the number of steps remaining to be taken to the end of that segment and to act upon said acceleration means at discrete distances before the end of the pattern to decrease pulse frequency to below the slewing range before the end of the segment. The discrete distances are also a function of the feedrate clock pulse frequency.

Also in accordance with the present invention means is provided to prevent stopping the system at any time until the stepping motor speeds are below the slewing rate.

In accordance with the present invention in order to achieve uniformity of pulse frequency input into each stepping motor, the interpolation pulses themselves are not used but step motor pulses are derived from the interpolation pulses. This is of particular significance with respect to the minor axes in which the interpolation pulses may occur in an irregular pattern. The step motor pulses derived from minor axis step motor pulses are more evenly speced in time than their corresponding interpolation pulses, depending upon and reflecting the rate of generation, and therefore are more readily accepted by the minor axis stepping motors without error.

More specifically, in accordance with the present invention, logic means is provided to select as a major axis that one of the axes having the greater number of steps to be taken over at least the segment next to be followed. An interpolation pulse train of evenly spaced pulses representing the major axis length of the segment is generated. A train of interpolation pulses is also generated for each minor axis representative of the length of that minor axis segment. Therefore, each minor axis pulse train is composed at most of no more pulses than the major axis pulse train and ordinarily fewer pulses, in which event the pulses most commonly are unevenly spaced from one another. Separate means are provided for each of said axes receiving interpolation pulses from said logic means and producing a step motor pulse for a predetermined number of interpolation pulses such that the variations in spacing of the minor axis interpolation pulse output is averaged and pulses representing a fixed speed occur at regular intervals. This means generating step pulses also has the effect of decreasing the potential error in resolution.

Therefore, the present invention, in addition to supplying the number and sequence of commands to each step motor to produce the movement of the parts to the required location by following a linear or arcuate path, also supplies those commands in such a manner as to provide for the dynamic characteristics of the step motor, even at slewing rates of the motor.

Other features and advantages will hereinafter appear.

For a better understanding of the present invention reference is made to the accompanying drawings in which FIG. 1 is a schematic block diagram of a programmable voltage to frequency convertor used to generate feedrate clock pulses;

Figure 1:
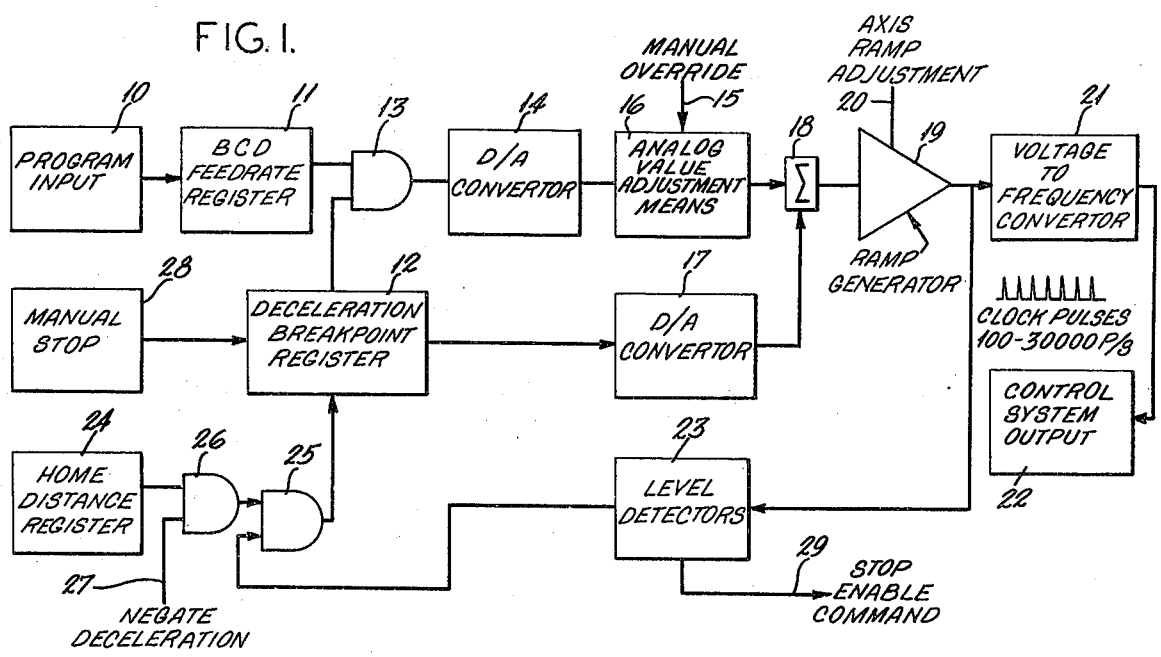

FIG. 1 shows a block diagram of a variable frequency pulse generator that provides the basic clock timing for the system. The programmed feedrate means input 10 takes input data from a punched or magnetic tape, for example, or from manual means in a form capable of being stored in binary coded decimal (BCD) form in a register 11. The outputs of this register are pulse trains which pass through gate 13. Gate 13 passes the binary coded decimal signal when the output of deceleration breakpoint register 12 provides a signal on its control terminal. If the deceleration breakpoints have not been detected, the digital information stored in the feedrate register is converted by digital to analog (D/A) converter 14 to an analog voltage that is directly proportional to the numerical feedrate number. A manually set feedrate override 15 enables an operator to visually observe what is happening and make manual adjustments to override the programmed digital feedrate by ±50% of that feedrate at run time by proportionally adjusting the adjusting means 16 to modify the voltage level of the output of the programmed D/A converter 14. Adjusting means 16 may be a transistor used for variable gain, where the manual override adjusts the gain. The adjusted voltage is then summed at summing junction 18 with the output of the deceleration breakpoint register 12 as modified by D/A convertor 17, similar to D/A convertor 14. If no breakpoint has been detected, the output of deceleration breakpoint D/A convertor 17 is equal to 0. The summed voltage becomes the set point to a ramp generator 19 that has two ramp rates, one for positive voltage changes and another for negative voltage changes. Axis ramp adjustment 20 may, for example, employ a Texas Instrument SN7274 dual operational amplifier. Additionally, there is provision for an external signal from axis ramp adjustment means 20 to adjust the value of the positive going ramp rate. The output of the ramp generator is converted to a pulse rate by a voltage to frequency oscillator 21 that provides the clock timing pulses for the rest of the control system 22. The output of the ramp generator is also monitored by several level detectors 23. Level detectors 23 may be, for example, Texas Instrument SN72747. The outputs of the level detectors are applied to gate 25 to control logic signals from a register 24 that contains discrete logical representation of the number of units the major axis is away from the point to which it is programmed to travel.

The deceleration breakpoint register 12 contains the digital representations of a predetermined inter-relationship based on comparison between actual feedrate, as determined by the level detectors 23, and the distance left to be travelled, as determined by the home distance register 24. The contents of the deceleration breakpoint register is converted to a voltage level by a D/A convertor 17 for using an opposing the analog signal from adjusting means 16. Breakpoints are preselected. For example, typical successive breakpoints for a preferred predetermined deceleration profile could be set as follows:

a. Feedrate greater than 24 inches per minute and distance from home less than 400 units.
b. Feedrate greater than 16 inches per minute and distance from home less than 200 units.
c. Feedrate greater than 8 inches per minute and distance from home less than 100 units.

Figure 2:
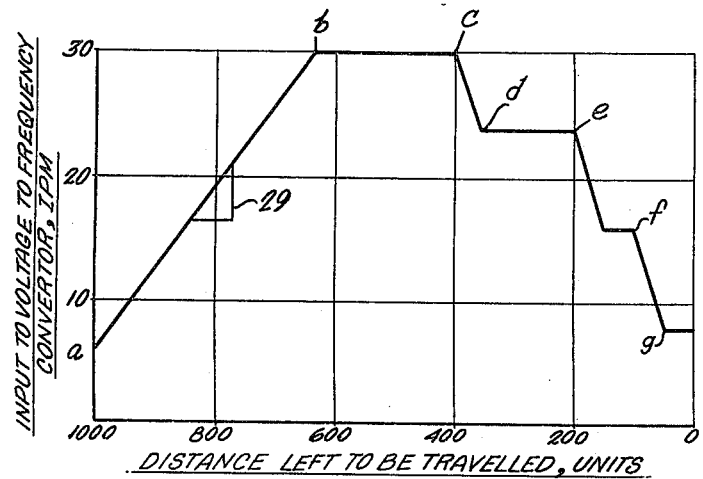
FIG. 2 is a chart of the voltage input to the voltage to frequency oscillator plotted against the distance the axes are away from the home position.
Figure 3:
FIG. 3 is a representation of the output pulses from the voltage to frequency converter.

FIG. 2 is intended to represent an acceleration deceleration pattern based on these figures. Assume the maximum programmed feedrate is 30 inches per minute and the programmed travel distance is 1,000 units. Referring to FIG. 2, there is shown a plot of voltage vs. distance to be travelled showing the inter-relationship between the home distance and the voltage input to the voltage to frequency convertor 21. Immediately after the programmed values are input, the output of the ramp generator ramps up from a residual value at point $a$, less than the slew rate of the motor (in the example shown equivalent to 6 inches per minute) to a point $b$ and a value equivalent to the program feedrate, e.g., here 30 inches per minute. The ramp rate (slope shown by projections 29 along coordinates) is selected and set at a value at which the step motors used in the system can safely pick up the inertial load it is driving. Since the inertial load from axis to axis may vary considerably, an axis ramp adjustment 20 is provided to adjust the ramp rate as a function of the most heavily loaded axis. The output of the ramp generator is clamped at 30 inches per minute until the home distance is less than 400 units at point $c$, at which point the first deceleration breakpoint is detected. The output of the feedrate register 11 is then negated by the breakpoint register 12 by removal of the control signal on gate 13 and the voltage value of the programmed D/A converter 14 goes to zero. At the same time, a voltage equivalent to slightly less than 24 inches per minute is output by the deceleration breakpoint D/A convertor 17 and input at the summing junction 18 of the ramp generator 19. The ramp generator then ramps down from point $c$ to point $d$ leveling off at 24 inches per minute. In a similar manner, breakpoints occur at points $e$ and $f$ in FIG. 2, causing the deceleration profile shown. The residual value $g$ is set below the "slew" rate of the step motor. The number of required breakpoints is a function of the inertia of the step motor and its load, and the system friction. FIG. 3 shows an approximate representation of the resultant pulse rate at system output 22.

Figure 4:
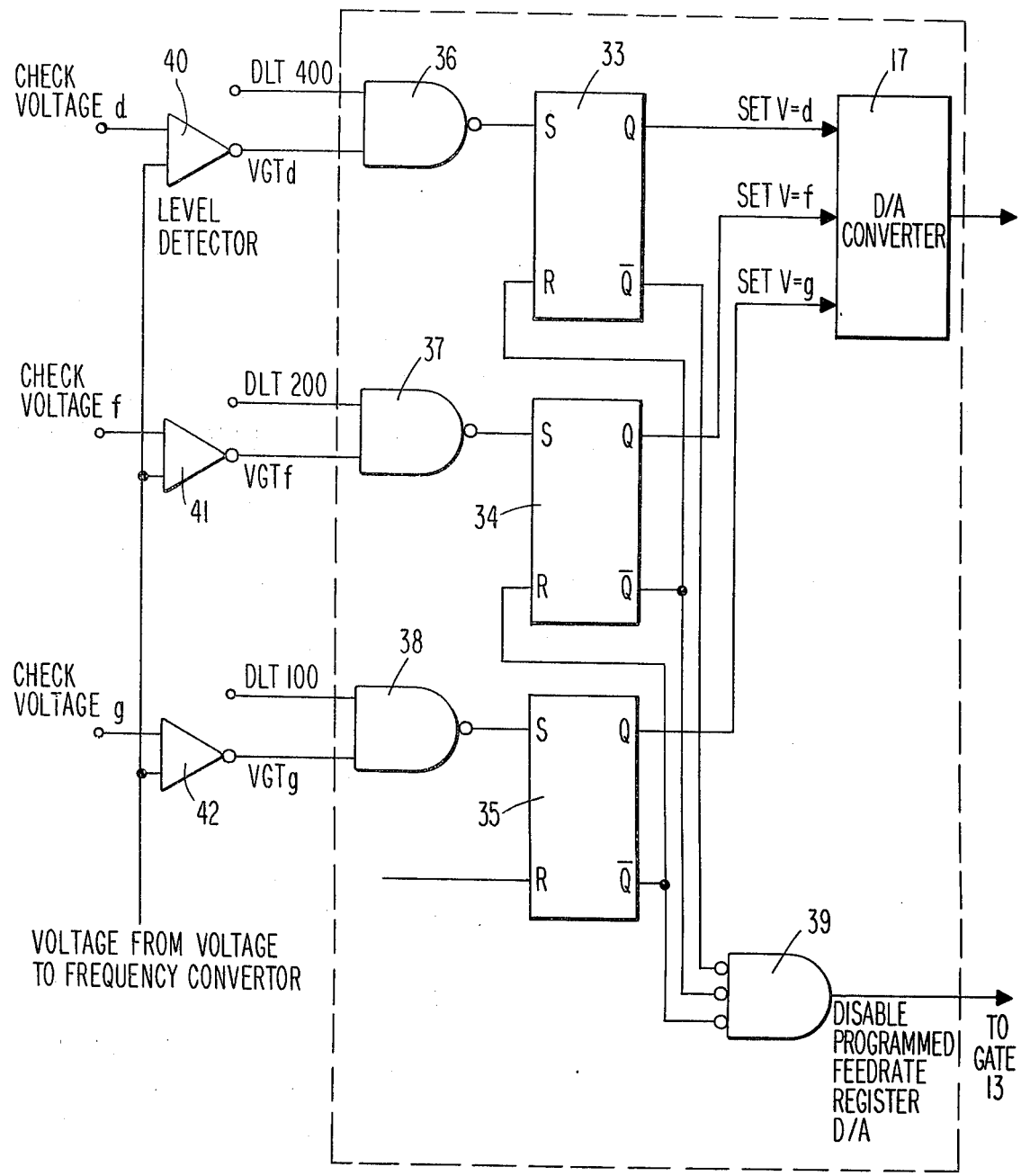
FIG. 4 is a schematic block diagram of the breakpoint register.

The deceleration breakpoint register is expanded in FIG. 4 which shows components employed in a typical system. The deceleration breakpoint register consists of a latch flip-flop 33, 34 and 35 preceded by a NAND gate 33, 37 and 38, respectively, for each discreet breakpoint required. In the diagram three breakpoint levels are shown corresponding to three breakpoint levels shown in FIG. 2, the levels being designated by the letters $d$, $f$, $g$. Input to one terminal of each of the respective NAND gates 36, 37 and 38 are differential amplifier 40, 41 and 42 to one terminal of which is applied voltage derived from the voltage to frequency converter 21. The differential amplifiers 40, 41 and 42 are in effect the level detectors 23 which give individual outputs as shown to control the different latches of the deceleration breakpoint register. Applied to the other terminals of the differential amplifier are the check voltages corresponding to levels $d$, $f$ and $g$ in FIG. 2, so that when the check voltage is matched by the voltage to frequency converter no signal output will be produced from the respective differential amplifier. The NAND gates correspond to gate 25 and receive reference signals from the home distance register 24 indicated as DLT 400, DLT 200 and DLT 100 to correspond to the respective designated distances in FIG. 2. Each latch 33, 34 and 35 is held open by its NAND gate as long as signals appear at both terminals. Loss of either or both signals at the NAND input causes the NAND output to drop to zero, which causes its output latch flip-flop to set. The output then acts upon the digital to analog converter 17 to control the output level to summing junction 18 and at the same time a signal is applied through the OR gate 39 to gate 13 to disable the programmed feed rate from program input 10 and BCD feed rate register 11, so that this signal no longer passes through gate 13 to digital to analog converter 14 to control drive motor speed.

Thus, when the distance left to be traveled is less than the breakpoint check distance (for example, 400 units shown a point c in FIG. 2) and the velocity of that point is greater than the predetermined required amount (level at d in FIG. 2), then latch 33 is set by gate 36. Latch 33 sets digital to analog converter 17 to produce a voltage output equivalent to level d at the input of voltage to frequency converter 21. Simultaneously, latch 33 through gate 39 acts to disable the BCD feed rate register 11 through gate 13 so that the frequency of the oscillator pulses from control system output 22 is determined by digital to analog converter 17 and, therefore, set at a value d.

The same procedure is followed at other levels as the distance left to be traveled successively reaches the next breakpoont. In this case when distance left to be traveled is 200 gate 37 trips latch flip-flop 34. Latch flip-flop 34 then sets the second deceleration voltage value f into the digital to analog converter 17 and unlatches flip-flop 33 with the disable signal to gate 39 which replaces that removed by latch 33. The differential inputs at NOR gate 36 are not able to relatch flip-flop 33.

In this manner successively the profile shown in FIG. 2 is generated. Specifically when the distance left to be traveled is 100, gate 38 trips latch flip-flop 35. Latch 35 then sets the third deceleration voltage value g into the digital to analog converter 17, replaces the disable signal and unlatches latch 34.

As seen in FIG. 1 an additional input means 27 is used to negate the output of the home distance register 24 so that no deceleration breakpoints occur. This is desirable when consecutive moves are approximately tangential so that deceleration is not necessary. Note that, if feedrates below the slew rate of the step motor, e.g., 8 inches per minute, are programmed, an acceleration - deceleration pattern does not occur, the input to the voltage to frequency converter 21 is always the adjusted output by adjustment means 16 of the programmed D/A converter 14.

An important advantage of the clock system of FIG. 1 is that the level detectors used in conjunction with the home distance to determine the deceleration breakpoints are constantly monitoring the actual input to the voltage to frequency convertor.

Another important advantage is that the use of many discrete breakpoints enable the step motors to operate with infinitely variable feeds within the slewing range of the step motor.

Another important advantage is that the level detectors are used to enable stopping the step motors without mis-stepping. It has been heretofore indicated that if the step motors are stepping at a pulse rate above their slew rate, the motors will mis-step if the command pulses to the step motor are instantaneously removed. In the present invention, depressing a stop button 28 will cause the ramp generator 19 to ramp down from its previously commanded rate to a residual rate below the slew rate of the step motor. Pulse output to the step motors will continue until the level detectors detect that the pulse rate has decreased to a rate below the step motor slew rate, at which time a stop enable command 29 will be output.

As appears in our U.S. Pat. No. 3,767,990, dated Oct. 23, 1973 for Control System For Producing MultiAxis Contour Movement For A Stepping Motor Drive, a multiaxis system is compatible with the present invention. In particular the multi-axis system described in that patent is preferred for use with the present invention inasmuch as the control of that axis selected as the major axis will automatically provide control of the minor axes. Thus in accordance with the present invention, there need be no duplication of the speed control system.

We claim:

1. In a system capable of movement of one part relative to another by relative movement of at least three series connected relatively movable members along a predetermined path and having step motors acting between said relatively movable parts to move said parts in discrete increments along a series of successive segments approximating said predetermined path, the improvement comprising a control circuit for generating a chain of pulses at variable frequencies for driving said step motors at variable speeds in accordance with system needs having:

pulse generator means in the form of a voltage to frequency convertor which responds to a voltage input through a voltage adjustment means for generating a train of pulses of variable frequency including means for varying the pulse frequency of pulses generated by said pulse generator means both above and below the slewing range of said step motors;

acceleration means for causing said pulse generator means to modify pulse frequency upon demand and particularly at the beginning of each segment exceeding a predetermined length to increase the pulse frequency from below slewing range into slewing range at a predetermined rate according to the inertial load on the step motors;

sensing means for sensing the number of steps remaining to be taken to the end of each such segment together with means for sensing the adjusted programmed feed-rate frequency and acting upon said acceleration means at some predetermined distance before the end of the segment to decrease pulse frequency to below the slewing range before the end of the segment, and stop enable means to prevent stopping of step motors until voltage is decreased below a predetermined level representative of the slewing speed of the step motor including means to sense voltage at the voltage to frequency convertor input and employ this voltage against the standard of said predetermined level.

2. The system of claim 1 in which the acceleration means causes the pulse frequency to increase to a predetermined maximum and the sensing means acts to adjust the acceleration means downward in steps causing the pulse frequency to be reduced from the maximum to an intermediate level at a first predetermined distance from the end of the pattern and to be further decreased at a shorter distance before the end of the pattern.

3. The system of claim 2 in which the sensing means acts to adjust the acceleration means downward successively to at least two different intermediate predetermined pulse frequency rates and a final pulse frequency rate below the slewing rate, respectively, at predetermined distances before the end of the pattern.

4. The system of claim 1 in which voltage level is fed back to means monitoring the remaining distance to a segment end point and at predetermined remaining distances decreasing the voltage input to the voltage adjustment means.

5. The improved system of claim 1 in which the sensing means for sensing the number of steps remaining acts upon said acceleration means to decrease pulse frequency at a fixed preprogrammed rate of decrease.

6. The improved system of claim 5 in which override means is provided to permit an operator to selectively increase or decrease said fixed preprogrammed rate of decrease to compensate for variable machining factors.

7. The system of claim 6 in which override means is a manual voltage adjustment means to permit an operator to manually increase or decrease a pre-programmed rate.

8. The system of claim 1 in which digital input information about the length of each segment is provided in connection with each successive segment along said predetermined path of movement including feedrate information which is converted to analog voltage level representative of feedrate.

9. The system of claim 7 in which digital information about the remaining length of a segment together with analog detectors which sense actual velocity is used as input to a deceleration breakpoint register which is programmed to provide reduced voltage input at predetermined distances from the segment end point and thereafter control the voltages applied to the voltage to frequency convertor.

10. The system of claim 1 in which manual stop means is provided which acts through deceleration means to decelerate step motors from a slewing speed at a predetermined rate of deceleration until the step motor speed is below the slewing speed at which point immediate stop is permitted by said stop enable means.

11. The system of claim 1 in which a ramp generator is employed to generate an acceleration rate analog signal, the rate being variable as a function of system inertia.

12. The system of claim 11 in which the ramp generator is variable by means of a sensed logic signal which is activated by preprogrammed information appropriate to the system.

13. The method of generating pulses at a variable frequency to control the speed of a step motor employing a voltage to frequency converter to generate such pulses, comprising generating an input voltage signal profile for the voltage to frequency converter proportional to a desired programmed step motor startup and steady state feed rate, adjusting the programmed feed rate to achieve an operator selected motor speed, counting down the remaining distance of travel to an end point, providing a pre-programmed digital input to reduce the motor speed in incremental steps at predetermined distances from the end point, sensing actual pulse feedrate as adjusted, and, dependent upon actual feedrate, modifying said pre-programmed digital input and in accordance with pre-programmed feedrate criteria substituting different inputs to reduce the motor speed in a modified pattern of incremental steps.

14. A system for generating pulses to control the speed of a step motor comprising a voltage to frequency converter, a pre-programmed digital input to generate an input voltage signal to such voltage to frequency converter, means to manually adjust said input voltage signal from a programmed to a selected value to achieve a selected speed, deceleration means responding to the pre-programmed digital input to select a discrete number of points situated a predetermined distance from an end point at which said digital input acts to sequentially and incrementally reduce the speed of said motor from the selected speed, means for sensing the selected input voltage signal to the voltage to frequency converter, and means responsive to said input voltage dependent upon selected feedrate frequency to modify the number and position from the end point of the discrete points in accordance with a predetermined program.

* * * * *

UNITED STATES PATENT OFFICE
CERTIFICATE OF CORRECTION

Patent No. 3,932,796            Dated January 13, 1976

Inventor(s) Marvin L. Kreithen and John J. Lawler

It is certified that error appears in the above-identified patent and that said Letters Patent are hereby corrected as shown below:

Col. 2, line 13, "speced" should be --spaced--;

Col. 3, line 47, "an" should be --and--;

Col. 4, line 34, "discreet" should be --discrete--;

Col. 5, line 1, "a" should be --at--;

Col. 5, line 14, "breakpoont" should be --breakpoint--;

Claim 9, line 1, "7" should be --8--.

Signed and Sealed this eighteenth Day of May 1976

[SEAL]

Attest:

RUTH C. MASON
Attesting Officer

C. MARSHALL DANN
Commissioner of Patents and Trademarks